H. S. MAXIM.
Feed-Water Heaters.
No. 150,478.
Patented May 5, 1874.
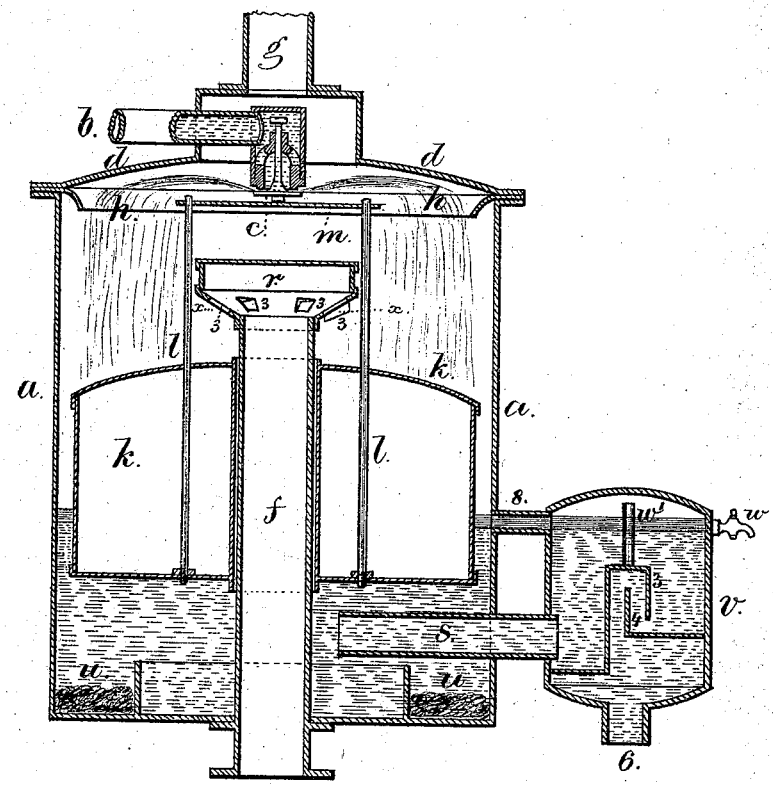
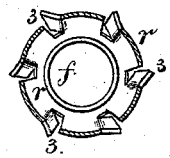

UNITED STATES PATENT OFFICE.

HIRAM S. MAXIM, OF BROOKLYN, NEW YORK.

IMPROVEMENT IN FEED-WATER HEATERS.

Specification forming part of Letters Patent No. 150,478, dated May 5, 1874; application filed December 10, 1873.

*To all whom it may concern:*

Be it known that I, HIRAM S. MAXIM, of Brooklyn, in the county of Kings and State of New York, have invented an Improvement in Feed-Water Heaters, of which the following is a specification:

The object of this invention is to open and close the inlet-water supply in proportion to the quantity of water in the heater, so that the level of the water may be maintained at a uniform height, or nearly so; also, to retain any oil that may pass from the engine into the heater, and prevent the same being pumped back into the boiler, so as to save such oil, and also prevent the detrimental effects arising from the greasy materials in the steam-generator. Furthermore, I provide a refuse or dirt trap, into which any foreign substances, such as cotton-waste, chips, and dirt, passing from the engine into the heater with the steam, or any solid substances in the water, shall be deposited, instead of going to the pump with the feed-water.

In the drawing, Figure 1 is a vertical section of said feed-water heater, and Fig. 2 is a sectional plan at the line $x\ x$.

The feed-water passes into the vessel $a$ through the pipe $b$, at the end of which pipe $b$ is a valve, $c$, closing upwardly, and also forming a deflector for spreading the water in a thin sheet beneath the top $d$ of the vessel $a$, so as to bring such feed-water into contact with the steam that is exhausted from the engine into the vessel $a$, such steam entering by the pipe $f$, and the surplus passing away by the pipe $g$. A deflecting-rim, $h$, may also be applied around the inside upper end of the vessel $a$, from which the water drips. Within the vessel $a$ is a float, $k$, with a tubular central opening, through which the steam-pipe $f$ passes, and from this valve-rods $l$ extend upwardly to the cross-head $m$, that is below the valve $c$, so that said valve is closed by the float rising as the water accumulates, and the reverse. The steam, as it discharges from the pipe $f$ into the vessel $a$, is deflected downwardly and spirally by issuing from mouths 3 in the cap $r$. In this manner the steam is brought intimately into contact with the feed-water spray as it falls; any pieces of cotton-waste or other foreign matter upon the float $k$ are deflected and thrown off by the force of the steam, and the float itself is partially turned, from time to time, sufficiently to free it from any obstructions, and also to keep the valve clean and fitting its seat correctly. The water going to the pump passes away by the pipe $s$ that extends sufficiently in beneath the float to prevent foreign substances falling into it, and such substances are received into the dirt-trap $u$. The vessel $v$ has within it the partitions 3 and 4, that form a trap for preventing the oil that may accumulate upon the surface of the water passing off to the pump by the pipe 6; and above that trap is a pipe, $w'$, that allows atmospheric air or vapor to be drawn into the pump, thus preventing the oil being drawn out of the trap. A cock at $w$ allows the oil to be drawn off, from time to time, from above the water, and by that means there is a saving effected, because the lubricating material that is carried away from the engine with the steam is condensed or deposited within the feed-water heater and taken away.

It is preferable to introduce the cock $w$ in the vessel $v$, because the oil will be quiescent therein, and to deliver said oil from the vessel $a$ the pipe 8 is employed at the water-line to connect the vessel $a$ with the vessel $v$.

I claim as my invention—

1. The valve $c$, at the lower end of the feed-water pipe $b$, closing upwardly and deflecting the water, in combination with the float $k$, surrounding the steam-pipe $f$ within the vessel $a$, as set forth, so that the valve spreads the feed-water in a thin sheet as it passes into the steam-space, as specified.

2. The cap $r$, with the mouths 3, at the end of the steam-pipe $f$, in combination with the vessel $a$, float $k$, and valve $c$, as specified.

3. A feed-water heater, provided with a trap to the pipe leading to the pump, constructed so as to draw the water off, but retain the oil floating upon the water, in combination with a cock for drawing off said oil, substantially as set forth.

Signed by me this 3d day of December, A. D. 1873.

HIRAM S. MAXIM.

Witnesses:
GEO. T. PINCKNEY,
GEO. D. WALKER.